United States Patent [19]

Green, Jr. et al.

[11] Patent Number: 4,630,053
[45] Date of Patent: Dec. 16, 1986

[54] ELECTRONICALLY CONTROLLED ARRAY FOR SIMULATION OF PASSIVE TARGET/BACKGROUND SIGNATURES AT MILLIMETER WAVELENGTHS

[75] Inventors: Augustus H. Green, Jr.; Gustaf J. Rast, Jr., both of Huntsville, Ala.

[73] Assignee: The United States of America as represented by the Secretary of the Army, Washington, D.C.

[21] Appl. No.: 675,916

[22] Filed: Nov. 28, 1984

[51] Int. Cl.$^4$ .............................................. G01S 7/40
[52] U.S. Cl. ..................................... 342/376; 342/168
[58] Field of Search .................. 343/5 PN, 17.7, 753, 343/754, 872, 376

[56] References Cited

U.S. PATENT DOCUMENTS

| | | | |
|---|---|---|---|
| 956,489 | 4/1910 | Fessenden | 343/754 |
| 3,386,099 | 5/1968 | Walter et al. | 343/754 |
| 3,955,199 | 5/1976 | Hutzelman et al. | 343/17.7 |
| 4,488,155 | 12/1984 | Wu | 343/17.7 |

OTHER PUBLICATIONS

R. Graf, *Dictionary of Electronics*; (p. 337; Sams, Inc., Indianapolis; 1974).

*Primary Examiner*—Theodore M. Blum
*Assistant Examiner*—Bernarr Earl Gregory
*Attorney, Agent, or Firm*—Freddie M. Bush; John C. Garvin, Jr.

[57] ABSTRACT

A system for an electronically controlled array for the simulation of passive signatures and noise at millimeter wavelengths. The system can simulate passive background signatures and also superimpose radiation intensity variation to simulate either moving or stationary passive signatures of targets over or within the background. A single, non-varying source of millimeter waves provides the non-coherent radiation for illumination that is required for simulating passive signatures. A controlled array variably controls radiation intensity at each illumination point of the array. The non-varying source is concentrated at the focal axis of a parabolic reflector, providing a plane wavefront of radiated energy.

11 Claims, 5 Drawing Figures

ELECTRONICALLY CONTROLLED ARRAY FOR SIMULATION OF PASSIVE TARGET/BACKGROUND SIGNATURES AT MILLIMETER WAVELENGTHS

DEDICATORY CLAUSE

The invention described herein may be manufactured, used, and licensed by or for the Government for governmental purposes without the payment to us of any royalties thereon.

BACKGROUND OF THE INVENTION

Several existing devices, such as a fluorescent light tube, emit considerable quantities of noise in the millimeter frequency bands. This knowledge is used in creating noise sources for evaluating the operation of receiving devices that are designed to operate against targets which can be detected upon the basis of a noise differential between a target noise energy level and the energy emitted by surrounding background. Typically, a target may be a vehicle such as a tank or aircraft and background may be woodland, desert, buildings, and sky.

A conventional energy source using a fluorescent light tube has been used as a simulation device to test passive receivers. When the passive receiver is located in a missile frame that is intended to home on a target based upon emitted energy differences between the target and its immediate environmental background, it is necessary to control the intensity of background radiation and the position or relative location of the source of this radiation when simulating environmental background. In this conventional noise source, the emitting element is an individual flourescent light tube that is mounted along an axis that lies between the focus of a parabolic reflector and the center of the parabola. Thus a distributed line source is created in front of a parabolic reflector. However, a distributed line source provides a variety of energy paths due to its defocused nature. Additionally, when placing more noise radiating elements on a simulator board, the parabolic reflector is modified to the point where, when viewing the reflector from the front, it appears to be substantially square. This design expediency causes a wavefront configuration that is almost impossible to accurately define at any given point. Energy emitted from each elemental unit (fluorescent tube-parabola combination) is controlled by varying the current through the particular fluorescent tube. At low electric current levels, required to simulate correspondingly low levels of radiation, the emitted energy of a fluorescent tube becomes erratic. This does not provide an adequate range of energy change to reasonably simulate the range change or background radiation experienced by a missile during a terminal mode of flight. Movement of an emitting source is simulated by reducing or eliminating the electrical power provided to the fluorescent lights, which in turn reduces or eliminates the noise energy transmitted in millimeter bands to establish a simulated target background energy difference pattern.

SUMMARY OF THE INVENTION

A system for simulating electromagnetic radiation of both target and background signatures at millimeter wavelengths is disposed to variably and selectably control radiation intensity at all illuminating points of an array. A non-varying or substantially constant source of radiation noise has radiation concentrated across the focal axis of a parabolic reflector, providing a plane wavefront of output radiated energy. Individual irises arranged in columns and rows (or other suitable array) can be spontaneously adjusted to control the degree of radiation across a wavefront that is passed therethrough, and thereby simulate a variety of backgrounds and targets as well as unique intensity of target and background radiation that would be sensed by sensors in a system closing fast on (approaching) the target.

DESCRIPTION OF THE PREFERRED EMBODIMENT

A source of radiant energy that is known to emit noise energy in millimeter frequency bands has the output radiation therefrom controlled to provide a transmitted plane wavefront of energy. A controlled array of individually variable apertures controls radiation intensity passing through each aperture or window of the array to control the intensity of radiation which can vary across the wavefront, thereby providing a precisely controlled radio frequency (RF) noise source.

Figure 1:
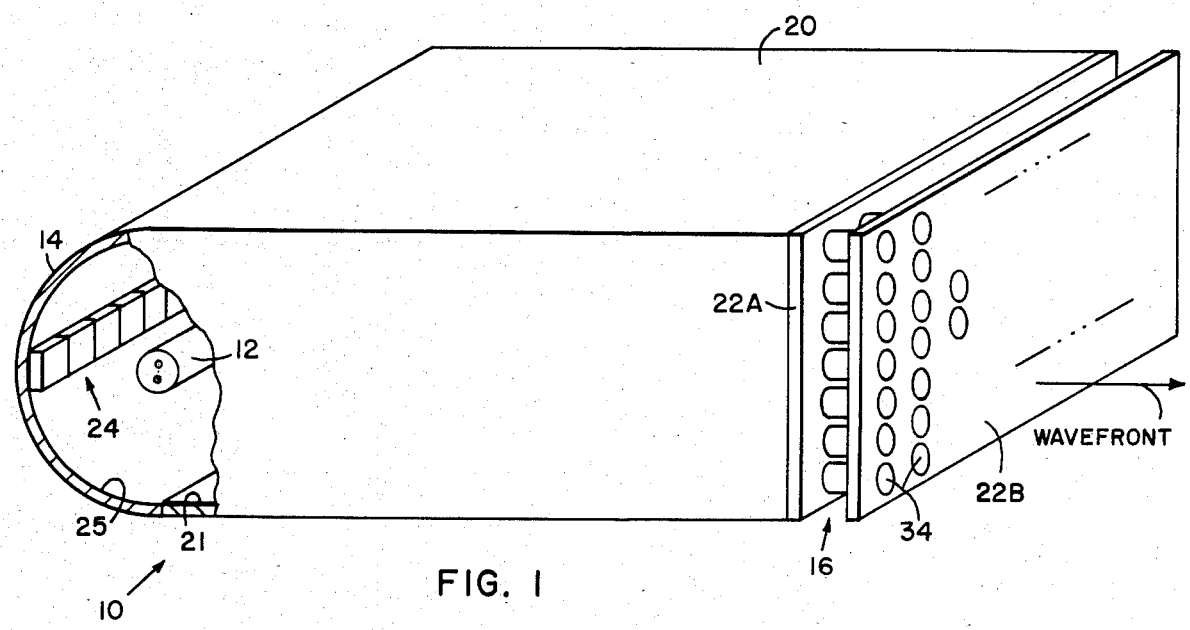
FIG. 1 is a pictoral view, partially cutaway, of a preferred embodiment of a simulation array unit for millimeter wave noise radiation with extraneous circuit components omitted.
Figure 2:
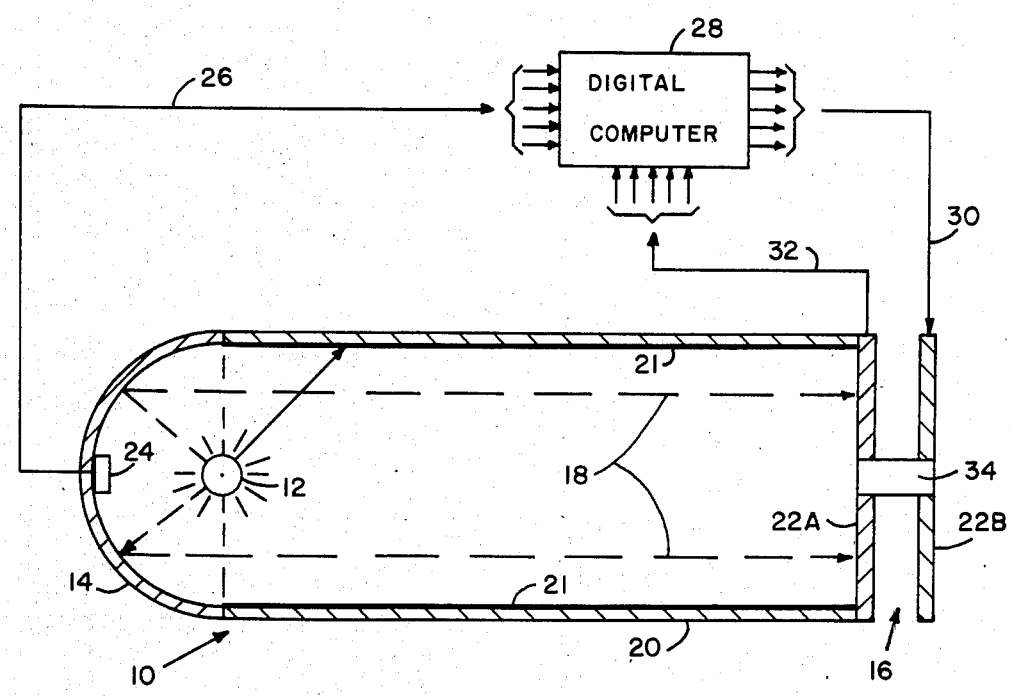
FIG. 2 is a diagrammatic sectional view of a simulation array unit taken normal to the longitudinal axis of the source of radiation of the array unit and showing a single line schematic coupling of the array to control circuitry.

Referring now to the drawings wherein like numbers refer to like parts, FIGS. 1 and 2 disclose a RF noise source unit for providing a plane wavefront of radiation. An electronically controlled array 10 (RF noise generator) for providing simulation signals at millimeter wavelengths is primarily comprised of a fluorescent light tube 12, a parabolic reflector 14, and an aperture array 16. Fluorescent tube 12 is located axially along the geometric focus of parabolic reflector 14. Reflector 14 directs a wave of energy 18 having a plane wavefront toward aperture array 16 when the reflector is illuminated by light tube or source 12. A cover or housing 20 encompasses the elements of the array or noise source 10 and may include externally disposed portions of reflector 14 and aperture array 16 or may actually completely encompass them except for providing an opening for the radiated wave to pass through. Thus cover 20 limits transmission of noise energy to that energy passing through aperture array 16. As shown more particularly in FIG. 2 the source of noise energy for the millimeter range of interest, the fluorescent light tube 12, emits energy in a radial pattern around the tube. The parabolic reflector collects a large portion of this energy and directs it into plane wave 18 directed toward plate or surface 22A. The inner surface of the entire structure between the reflector 14 and plate 22A is coated with a layer of absorbent material 21 to control, prevent or reduce interference patterns that can be introduced by energy reflecting from these surfaces. A linear array of energy detectors 24 mounted in the parabolic reflector inner surface 25 immediately behind fluorescent light tube 12, lies substantially in a plane normal to the surface of plate 22A. These detectors will not interfere with reflective operation of the reflector surface because the detectors are in an area that is blocked by the physical dimensions of fluorescent light tube 12. The number of detector 24 units which may be used correspond to and align with the number of columns of holes or apertures in blocking plates 22A and 22B of array 16. Variations in radiated energy intensity along the surface of fluorescent light tube 12 are sensed by the individual detectors of array 24 and an output from each detector is coupled through respective conductors 26 to a digital computer 28. Computer 28 provides a set of drive commands to an iris drive circuit (set forth hereinbelow) of aperture array 16 via conductor 30 and receives iris positioning data via conductor 32. Thus iris positioning data is coupled to the computer at all times to indicate the degree of openness of each iris. Each iris in the array can then be closed or opened to a degree to provide the desired composite radiated energy in the emitted wavefront.

As shown simply in FIGS. 1 and 2, aperture array 16 comprises two plates 22A and 22B spaced apart with tubular optical or aperture structure paths 34 therethrough. These two plates function as blocking plates to prevent unwanted radiation from affecting the output radiation and to support the iris and lens structure of the optical paths 34. The inner surface of plate 22A, i.e., the surface exposed to radiation 18 may also be coated with absorbent material 21 just as support structure 20 is coated. The two blocking plates are simply mechanical mounting plates to support the individual aperture structures in their respective columns and rows. The actual quantity of optical paths arranged in columns and rows of openings through the plates can be varied to suit the physical size of the apertures and the maximum number that can be physically mounted in the area provided by the blocking plates. While a particular hole or aperture arrangement is shown the holes may be varied to suit particular radiation requirements.

Figure 3:
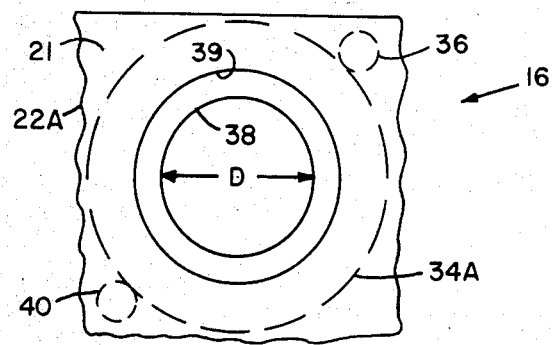
FIG. 3 is an end view of one iris of the aperture array through which output radiation is directed.

FIG. 3 is a schematic diagram of an end view of one aperture structure 34A of an aperture array 16 and shows a simplified electrical drive circuit and pick-off in conjunction with the variable optical path through respective aperture structures. Since each aperture structure is identical, as well as its associated drive and pick-off circuitry, only one typical unit is disclosed in detail. As shown, one end of aperture structure 34A is shown supported by blocking plate 22A and is in very close proximity to other structures 34. Plate 22A is coated with the absorbent material 21. An electrical drive motor 36 is located behind the plate and is mechanically coupled to drive the leaves forming an iris diaphragm and thereby operate aperture structure 34A to control the degree of iris opening 38 from a maximum diameter D down to closure. Energy flow through the aperture structure is controlled by increasing or decreasing the diameter "D" with drive motor 36. A potentiometer 40, also located behind the plate 22A, provides iris opening position information to the computer. At each aperture or iris opening 38, plate 22A has an opening 39 therein of sufficient size that the maximum diameter is equal to or slightly larger than D, allowing maximum energy passage and maximum use of absorbent materials.

Figure 4:
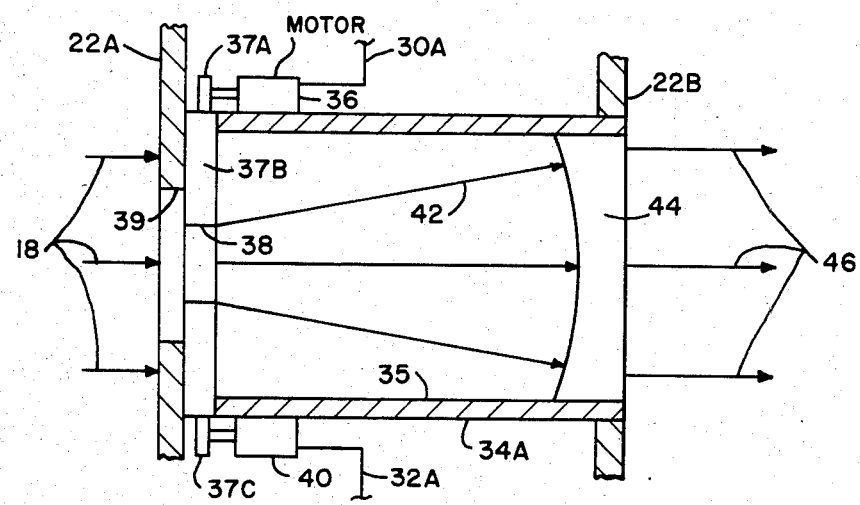
FIG. 4 is a detailed cross section of a typical individual aperture element with extraneous components omitted.

FIG. 4 is a more detailed drawing in partial section of a typical aperture structure 34A. Plates 22A and 22B are shown cross-hatched, disclosing the opening 39 in plate 22A and lens 44 in plate 22B. In transfering the radiated energy 18 through the aperture array a plane wavefront impinges upon the iris array of the aperture structures 34. This plane wavefront 18 is also shown in FIG. 2. Iris 38 can be placed in any position from completely closed to the maximum opening which is on the order of 60 to 80 percent of the total iris cross section depending upon the particular commercially available iris design used. Plane wavefront 18 is converted by the iris array into a spherical wavefront 42 through inherent refraction properties of each iris. This spherical wavefront 42 is then collected by lens 44 to again transform the wave front into a plane wavefront wave 46 which is emitted from the aperture structure. The walls of aperture structure 34A are shown cross-hatched and have the interior surface 35 thereof also coated with a layer of absorbent materials to control interference from reflected energy patterns. The various components (aperture, lens, absorbent material) are selected according to their electromagnetic properties to ensure that a plane wave 18 input results in a plane wave output 46, while continuous control is maintained on the quantity of energy that flows through the aperture structure 34 element.

Drive motor 36 rotates a gear 37A that in turn drives a gear 37B on the housing of the aperture structure to open and close the aperture leaves of the iris. Mechanical stops, not shown, may be used to stop the forward and reverse rotation of gear 37B at the maximum opening or closure of the iris respectively. A conductor 30A connects from drive motor 36 to the computer to drive the motors forward and reverse during opening and closing of the iris. Position monitoring potentiometer 40 is in turn driven by gear 37B via gear 37C to vary the output of the potentiometer from a maximum to a minimum as the iris opening varies accordingly. The output from the potentiometer, a function of the aperture opening is then coupled via conductor 32A (FIGS. 2 and 3) to the computer. The iris assembly is selected such that it has two sections (not shown), one section that is fixed mounted to the aperture structure body and the other that is attached to the ring gear 37B. The iris drive motor is connected to the ring gear to perform the drive mechanism for changing the iris opening size. The position monitoring potentiometer, also connected to the ring gear 37B, provides an output indicative of the status of the iris opening radius. The iris may utilize a large opening (for example, 60 millimeters) but must also be capable of providing complete closure to completely restrict energy flow.

The noise generator as shown in FIG. 1 is a complete unit that can be utilized independently or stacked in rows and columns to form a large target array for a system type simulation.

It is well known that terrain, foliage, buildings and moving objects such as aircraft, tanks or machinery radiate differing degrees of electromagnetic energy due to natural reflections from the sun, or from specific known wavelengths of energy directed toward them by a man made transmitter. The simulator or noise generator 10 takes advantage of this to provide a simulated reflection of radiated energy from various background and target objects. The simulated reflection of radiation is then detected by receivers or other detecting and sensing equipment (not shown) so that the sensing equipment can be evaluated respecting its ability to discriminate between a desirable target and surrounding background.

Thus, in operation of the simulator or noise generator for selected millimeter wave frequencies to be detected, the individual irises are opened from complete closure to a maximum amount to transmit a noise wave having a plane wavefront indicative of a background area or region in which one or more targets may be present. By changing the respective iris openings the simulated background may be increased or decreased and the simulated target may be more or less hidden or made to appear to change positions, i.e. move. Detectors 24 provide an indication of the variation in output energy along the length of and normally from the surface of tube 12. This energy is substantially of equal strength or intensity within each plane of radiation normal to the length of the tube 12. For known (measured) values of this radiation, the columns of irises corresponding with respective detectors in a given plane of radiation (normal to the length of the tube) are individually adjusted to pass a predetermined intensity representing the background or target portion present at that point of simulation. Obviously, these incremental adjustments can be made manually, even though this is a slow and tedious procedure of adjusting several or all of the irises between each interval of noise generation, or the adjustment can be controlled automatically to be a predetermined programed sequence of changes. For automatic adjustment a digital computer may be used to compare the inputs from detectors 24 to a reference value indicative of intensity desired at that point of simulation and to open or close the respective irises to obtain the desired degree of output intensity. Leads 30 provide manual or controlled position drive signals to the motors to control the iris openings as has been noted and leads 32 convey the signals from the potentiometers that are indicative of the degree or percentage of openness or closure of the irises. Obviously, radiation from the tube 12 may occur continually or may be turned on and off during periods of iris adjustment depending on the type of testing and manner of iris adjustment being used.

Figure 5:
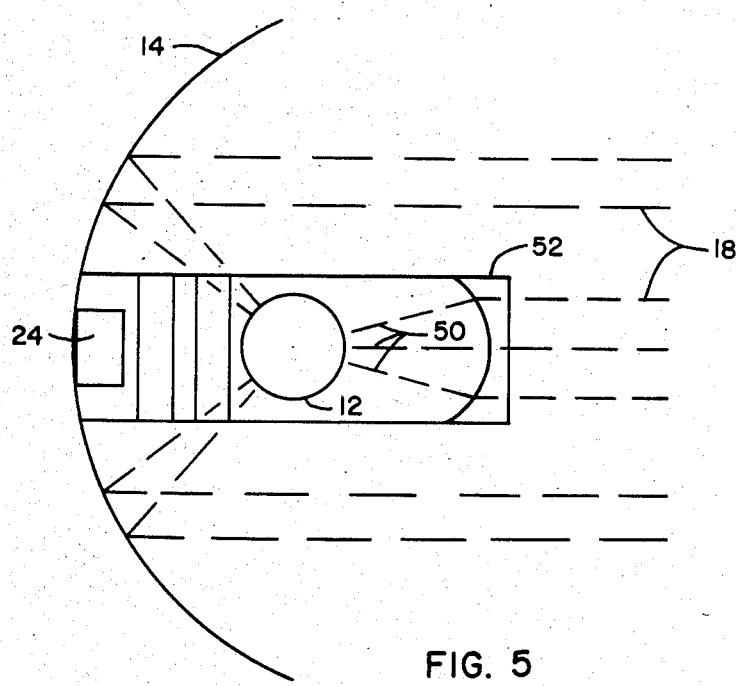
FIG. 5 is an alternate feed structure arrangement for providing a more precise plane wavefront.

As shown in the preferred embodiment of FIG. 2 the existence of the cylindrical portion of the wave emitted from fluorescent light tube 12 and not directed toward reflector 14 was not considered. In many cases this radiation may not affect the operation of the system. However, if the radiated energy 18 is to be truly a complete plane wavefront, an arrangement such as that shown schematically in FIG. 5 can be used to eliminate any interference from non plane wavefront energy in the radiated pattern. Radiation 50 from the forward portion of the fluorescent light tube 12 can be controlled by using a lens structure 52 such as a metal lens. Properly spacing lens structure 52 will cause most of the forward radiated energy to be transformed to plane wave energy by this lens. This simple modification is shown with reference to parabolic reflector 14 and detectors 24. The remaining portions of this embodiment are identical to the preferred embodiment. The small percentage of radiation escaping from the relector 14 and lens 52 is readily absorbed in absorbent material 21.

Both lens 44 (FIG. 4) and lens 52 (FIG. 5) are metallic lens structures. Dielectric lenses are currently not available in the millimeter region with the required performance capability. Should dielectric lenses be developed such that their performance capability exceeds that of metal lens structures, it is a simply matter to replace one lens structure with the other. The curvature on a dielectric lens and metal lens are the inverse of each other since the dielectric constant in a dielectric lens is greater than one whereas the metal lens has an equivalent dielectric of less than one. This technology is discussed in detail in *Microwave Antenna Theory and Design*, Chapter 11, entitled "Dielectric and Metal Plate Lenses" by J. R. Risser, published by McGraw-Hill in 1949.

The terminal homing operation of a passive target tracking missile in an enclosed anechoic chamber may be simulated by using the array of FIG. 1 as a basic building block to construct a large composite array of these individual arrays as noted hereinabove. Typical operation of this device in a simulated missile terminal flight pattern include:

(1) An equivalent passive target such as a tank can be simulated in its background by simply controlling the individual aperture structures to establish the equivalent radiation pattern desired. Simulation of the missile (housing the sensor or detector) flying into this target can be done by controlling the radiation intensity, with the intended simulation range determining the actual power level transmitted.

(2) Simulation of a target that is moving is done by shifting the control pattern of the individual apertures to create an illusion of movement. Complete control from full power output to complete power cutoff by each aperture structure allows a wide range of operations to be artifically created. The large number of apertures of controllable nature and a plane wavefront output permits creation (simulation) of signal sources of various equivalent cross-sectional size. This accounts for target returns gradually filling a missile antenna beamwidth as the missile approaches the target.

(3) Using a relatively large number of small apertures allows point source type targets or targets that have a distribution of closely spaced points to be simulated and studied. The plane wave is absolutely essential for this type operation.

(4) Since each individual aperture is fully and independently controllable with a closed loop capability for compensated noise level via the detector system, a wide range of operations to be simulated under carefully controlled conditions is afforded. Unlike other passive device sources, the computer is not used to control the source fluorescent light but can keep it operating under a closely controlled constant condition. This allows a wide range of signal change without creating catastrophic noise level changes associated with changes in current levels through the flourescent light tube.

Obviously many modifications and variations of the present invention are possible in the light of the above teachings. It is therefore to be understood that within the scope of the appended claims the invention may be practiced otherwise than as specifically described.

We claim:

1. An electronically controlled noise generator comprising: a source of noise emission in the millimeter frequency bands, means for converting the noise emission to a plane wavefront output wave of transmitted energy having a plurality of individually controllable wave portions, and means for controlling the transmitted output wave such that said individually controllable portions of the wave have variable intensity of radiation for providing a transmitted wave of noise energy, and said means for converting being disposed for directing said plane wavefront toward said means for controlling.

2. An electronically controlled noise generator as set forth in claim 1 wherein said source of noise emission is an elongated source radiating noise energy radially around a longitudinal axis, and said means for controlling comprises an aperture array having a plurality of controlled apertures therethrough for passing respective of said individual wave portions therethrough.

3. An electronically controlled noise generator comprising: an elongated source of noise emission in the millimeter frequency bands which radiates noise energy radially around a longitudinal axis, means for converting the noise emission to a plane wavefront output wave of transmitted energy having a plurality of individually controllable wave portions, and means for controlling the transmitted output wave such that said individually controllable portions of the wave have variable intensity of radiation for providing a transmitted wave of noise energy, said controlling means being an aperture array having a plurality of controlled apertures therethrough for passing respective of said individual wave portions therethrough, said aperture array comprising a plurality of aperture units and first and second blocking plates supporting said aperture units therebetween for providing said controlled apertures through the array, each of said aperture units comprising a variable iris input, a lens output and housing means providing a path between the iris and the lens for said transmitted energy to pass therethrough, and said means for converting being disposed for directing said plane wavefront toward said controlling means.

4. An electronically controlled noise generator as set forth in claim 3 wherein each of said aperture units further comprise driving means for controllably varying the opening of said iris for controlling the amount of electromagnetic radiation passed therethrough, and sensing means responsive to said driving means for detecting the degree of iris opening.

5. An electronically controlled noise generator as set forth in claim 4 wherein said iris opening or aperture may be completely closed and said lens is a metal lens.

6. An electronically controlled array for generating selectable, known millimeter wavelengths having a plane wavefront of transmission comprising: a source of cylindrically radiated millimeter wave emission, converting means adjacent to said source for receiving and changing the emission into a plane wavefront of directed energy, said converting means being a parabolic reflector and a metal lens, said source being disposed between said parabolic reflector and said metal lens, and a controlled aperture array for receiving the wave of directed energy and for passing individual portions of said wave, across a cross-section of the wave, as an output wave having said plane wavefront of transmission, said lens being disposed between said source and said controlled aperture array, said parabolic reflector being disposed for capturing millimeter wave radiation of said source that is directed substantially away from said lens and directing said radiation in a plane wavefront wave toward said array, and said lens being disposed for collecting energy that is radiated substantially toward said array and directing said radiation in a plane wavefront wave toward said array.

7. An electronically controlled array as set forth in claim 6 wherein said source is an elongated fluorescent light tube for radiating millimeter wave noise energy radially around the longitudinal axis of the tube, said parabolic reflector and said lens are disposed along the length of the tube with the tube being at the geometric focus of the reflector for creating the reflected plane wavefront.

8. An electronically controlled array as set forth in claim 7 and further comprising a longitudinal detector array disposed selectively in said parabolic reflector for detecting millimeter wave transmission from said tube, said detector array lying in a plane with said tube that substantially lies parallel with the direction of radiation of said wavefront such that millimeter wave energy absorbed by individual detectors of said detector array is indicative of the intensity of radiation from said tube across corresponding cross-sections of the tube.

9. An electronically controlled array as set forth in claim 6 wherein said controlled aperture array comprises a plurality of aperture units and first and second blocking plates supporting said aperture units therebetwen for providing individually controlled aperture units through the array, each of said aperture units comprising a variable iris input, a lens output, and housing means providing a path between the iris and the lens for said transmitted energy to pass therethrough.

10. An electronically controlled array as set forth in claim 9 wherein said each of said aperture units further comprise driving means for controllably varying the opening of said iris for controlling the amount of electromagnetic radiation passed therethrough, and sensing means responsive to said driving means for detecting the degree of iris opening, said iris opening or aperture may be completely closed and said aperture unit lens output is a metal lens.

11. An electronically controlled array as set forth in claim 10 and further comprising control means coupled to said detector array, said driving means, and said sensing means for controlling the individual drive motor positions and the respective iris opening positions of each unit in response to corresponding output signals from said detector array and said sensing means to controllably vary the degree of radiation transmitted across the plane wavefront output from said aperture array.

* * * * *